No. 828,863. PATENTED AUG. 14, 1906.
A. J. ROBERTSON.
AUTOMOBILE WHEEL.
APPLICATION FILED OCT. 6, 1905.
2 SHEETS—SHEET 2.
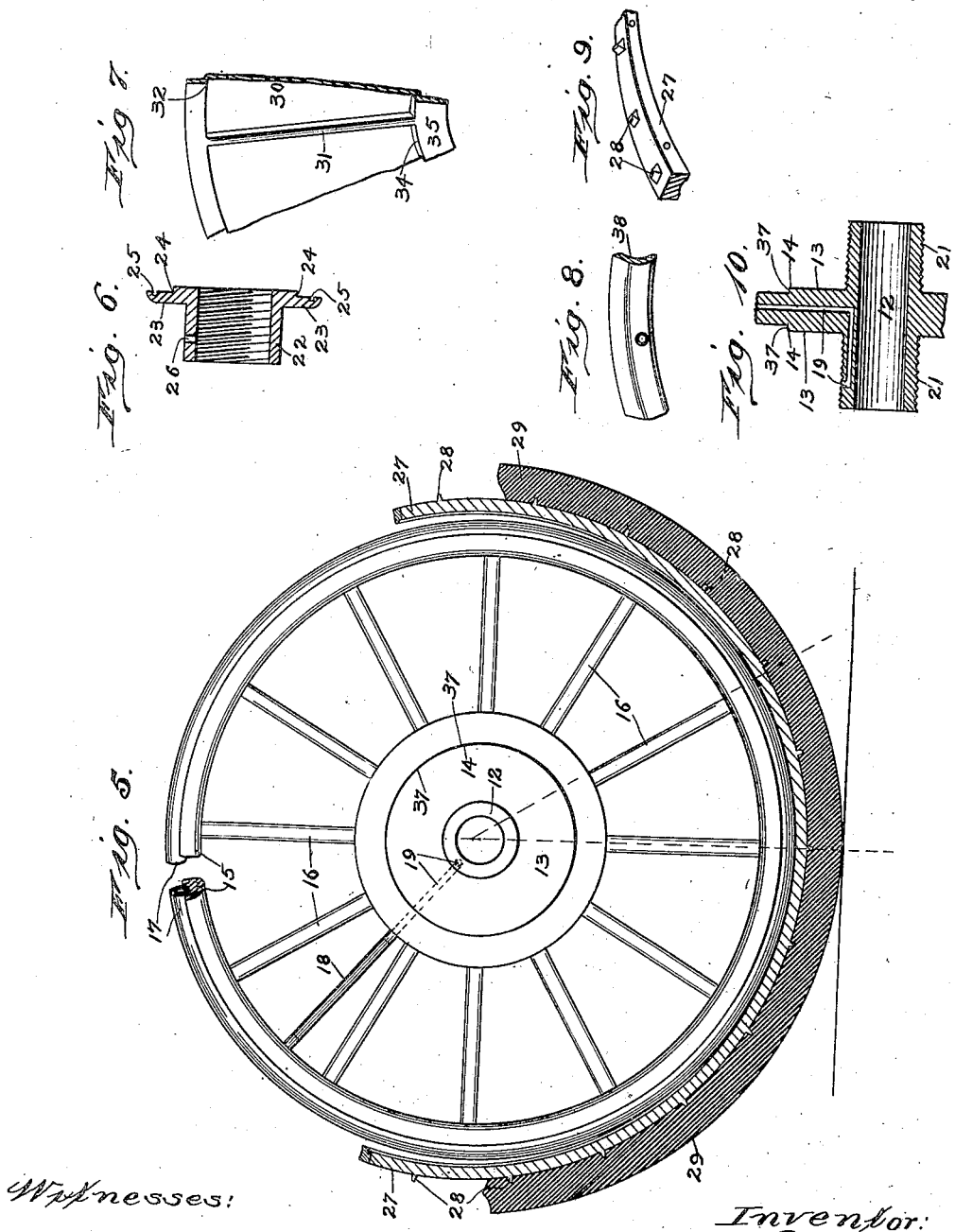
Witnesses:
Chas. E. Gorton.
M. A. Nyman.
Inventor:
Archibald J. Robertson.

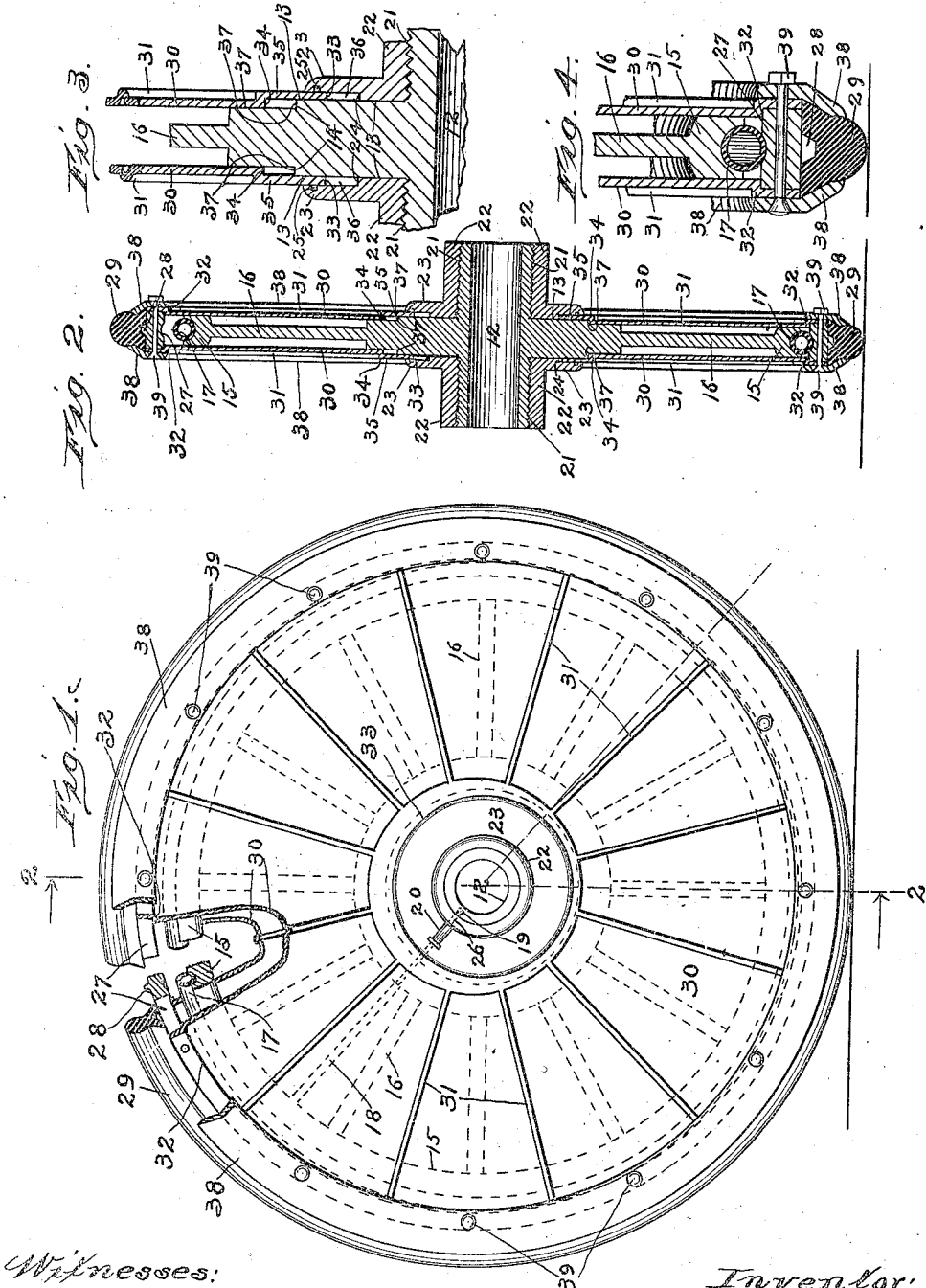

UNITED STATES PATENT OFFICE.

ARCHIBALD J. ROBERTSON, OF CHICAGO, ILLINOIS.

AUTOMOBILE-WHEEL.

No. 828,863.   Specification of Letters Patent.   Patented Aug. 14, 1906.

Application filed October 6, 1905. Serial No. 281,645.

*To all whom it may concern:*

Be it known that I, ARCHIBALD J. ROBERTSON, a subject of the King of Great Britain, residing at Chicago, in the county of Cook and State of Illinois, have invented certain new and useful Improvements in Automobile-Wheels, of which the following is a specification.

While my invention is applicable to wheels for other purposes it relates more intimately to those used upon automobiles, and to these the leading feature is that by my new construction the necessity for split shafts and differential or equalizing gears is done away with. Moreover, the invention makes possible the use of smaller and cheaper tires, avoids punctures, obtains better cushioning, gives a more economical use of power, and in case of damage the injured part may be removed and replaced with little labor and expense.

In general terms the invention may be said to consist in the combination of an inner and an outer wheel, both rotating in the same plane, but having differential speeds and separate axes of rotation, which, however, insure the rim of the outer wheel being always in contact with the rim of the inner at some point at or in advance of the wheel base-line, the rim of the inner wheel carrying an elastic tire, preferably pneumatic, and the rim of the outer wheel also carrying an elastic tire which may be solid or semisolid or even pneumatic, the outer wheel-rim thus covering and protecting the inner tire and at the same time being elastically sustained by it at or near the tread-line.

In order to enable others skilled in the art to which my invention pertains to make and use the same, I will now proceed to describe it, referring to the accompanying drawings, in which—

Figure 1 is a side elevation of a wheel embodying my invention, slightly broken away to expose interior parts—to wit, the inner rim and its tire and the outer rim and its connection with its tire in particular. Fig. 2 is a vertical transverse section through the said wheel on the line 2 2 of the preceding figure; Fig. 3, an enlarged detail in cross-section of the sliding and rotating connection between the two wheels adjacent to the axle-bearing of the inner, whereby the outer is allowed to rotate on its own independent axis and differentially to the inner; Fig. 4, an enlarged detail in cross-section of the two wheel-rims, taken from the wheel base-line and showing the outer wheel-rim in contact with the tire of the inner. Fig. 5 is an elevation of the inner wheel, showing also a part of the outer wheel-rim and its tire in section; Fig. 6, a detail of one of the sleeve-nuts by which the outer wheel is slidingly and rotatively secured to the hub of the inner wheel. Figs. 7, 8, and 9 are details of various parts hereinafter referred to; and Fig. 10, a central longitudinal section through the hub of the inner wheel, showing also a part of a central annular flange and a duct through the hub and flange for the inflating-tube of its tire when pneumatic.

Referring now to said drawings, the numeral 12 represents the hub of the inner wheel, formed with an annular flange 13, shouldered circumferentially, as at 14. This flange may be continued as a disk to the inner wheel-rim 15, where great strength is required and lightness is not of importance; but in a wheel of the automobile type it is best to connect the flange and rim by spokes 16, which may be integral with the hub and flange or attached thereto and to the rim in any suitable manner. In the present instance the rim is shown as cupped for the reception of a pneumatic tire 17, connected by inflating tube 18 with duct 19 (see Fig. 5) in the flange and hub, Fig. 10, which duct is closed by valve 20. (Shown in Fig. 1.) The hub is screw-threaded at 21 on each side of the flange to receive sleeve-nuts 22, which have peripheral flanges 23 at their inner ends, shouldered at 24 and provided with packing-grooves 25, whereby they are made to serve as sand-bands in addition to another function, presently explained. One of these sleeve-nuts has a small duct 26, which is made to register with the inflating-duct 19 in the hub. This aperture or duct 26 receives the aforesaid valve 20, which operates in the usual way.

The outer wheel consists of a rim 27, herein shown as provided with lugs 28, to prevent slipping of the solid rubber tire 29, by which it is inclosed, although other provisions may be made for other forms of tires. The rim is connected with the hub by sheet-metal disks 30 to entirely inclose the inner wheel and act as fenders. Said disks are struck up with radial strengthening-ribs 31, resembling spokes, though this may be dispensed with, especially where the disks are sufficiently heavy in themselves. At the outer perimeter they are annularly shouldered, as at 32, to receive and support the outer rim, and at the center they have a circular opening 33 of somewhat greater diameter than that inclosed by the annular shoulders of the sleeve-nuts on the hub. A short distance above this opening they are outset by annular shoulders 34 to form lips 35, which enter into the space 36 between the shouldered sleeve-nuts and the flange on the hub and rotate and play therein. The shoulders 34 in this instance are stopped against the annular shoulders 37 on the flange of the hub. Clamping-rings 38, serving to hold the tire 29 to the outer rim, are bound to said rim and bind the disks thereto by bolts 39, serving to complete the structure.

It will be understood that in assembling the parts the disks 30 are first applied to the hub and attached to the outer rim one at a time and the sleeve-nuts applied last of all.

With this construction the center of the wheel base-line, with the wheel at rest, is represented by the vertical dotted line in Fig. 1, and the inclined dotted line in said figure represents the direction in which the weight of the vehicle is shifted when moved by force, thus representing a constant economy in power.

It is evident that the tire upon the inner wheel-rim greatly increases the bite or frictional contact between that rim and the rim of the outer wheel and minimizes the possibility of slip. It may be considered, therefore, as representative, broadly, of a covering or tire for said inner rim of a high coefficient of friction. It is evident also that in some classes of wheels the tire upon the outer rim will be omitted and the lugs upon said rim relied upon for the bite upon the ground in the same manner as the lugs upon many wheels used in agricultural machines nowadays. When the tire is applied, however, the lugs bite upon it and prevent it from slip.

Having thus fully described my invention, what I claim as new, and desire to secure by Letters Patent, is—

1. The combination, to form a vehicle-wheel, of an inner and outer wheel, both rotating in the same plane with differential speeds and separate axes which bring the rim of the outer wheel always in contact with the rim of the inner near the wheel base-line, a pneumatic tire on the inner wheel, a duct through the hub of said inner wheel, an inflating-tube leading therefrom to the pneumatic tire and a valve carried by said hub at the entrance to the duct, and an elastic tire upon the rim of the outer wheel.

2. The combination, to form a vehicle-wheel, of an inner wheel, its hub having a central annular flange annularly shouldered on both sides, sleeve-nuts taking over the screw-threaded cylindrical extensions of the hub on each side of said flange and annularly shouldered to form therewith annular pockets or recesses concentric with the shoulders on both flange and nuts, an outside wheel revolving in the same plane with and around said inner wheel but at a differential speed and different axis, shields or guards supporting the rim of the outer wheel and having central apertures considerably exceeding in diameter the diameter of the annular flanges on the aforesaid sleeve-hubs, formed also with annular shoulders or jogs concentric with the apertures to take over and play against the shoulders of the hub-flange, and tongues extending inward therefrom to play in the pockets between the sleeve-nuts and said flange, whereby the connection between the outer rim and the inner wheel-hub is made to permit both sliding and independently-rotating movement.

ARCHIBALD J. ROBERTSON.

Witnesses:
CHAS. E. GORTON,
M. A. NYMAN.